United States Patent [19]

Van Den Driessche

[11] 4,271,427
[45] Jun. 2, 1981

[54] CIRCUIT FOR DECODING CHROMINANCE SIGNALS IN THE SECAM TELEVISION SYSTEM AND A TELEVISION RECEIVER COMPRISING THIS CIRCUIT

[75] Inventor: Michel Van Den Driessche, Paris, France

[73] Assignee: Thomson-CSF, Paris, France

[21] Appl. No.: 45,765

[22] Filed: Jun. 5, 1979

[30] Foreign Application Priority Data

Jun. 9, 1978 [FR] France ........................... 78 17280

[51] Int. Cl.³ ............................................. H04N 9/40
[52] U.S. Cl. ...................................... 358/40; 358/23
[58] Field of Search .................. 358/40, 21 R, 23, 37, 358/27, 14

[56] References Cited

U.S. PATENT DOCUMENTS 4,135,201  1/1979  Dickie et al. ........................ 358/40

OTHER PUBLICATIONS

Yoshino et al., "Chrominance Circuits for Secam Colour TV Receiver", National Technical Report, vol. 20, No. 6, pp. 786-800, Dec. 1974.

Primary Examiner—Jin F. Ng
Assistant Examiner—Michael A. Masinick
Attorney, Agent, or Firm—Cushman, Darby & Cushman

[57] ABSTRACT

The invention relates to a circuit for decoding chrominance signals from the composite videofrequency signal in the Secam color television system. In order to direct each chrominance signal to the corresponding channel, it is proposed in accordance with the invention to extract the demodulated signals at the beginning of each line and to treat them in the first place by a controlled circuit which equalizes their d.c. voltages, in the second place by a color identification circuit which synchronizes the commutator with the television transmitter and in the third place by a "keeper" circuit for identifying the Secam process which inhibits the chrominance circuit if the transmission is by another process or parasitized. Application to television receivers using the Secam system.

8 Claims, 10 Drawing Figures

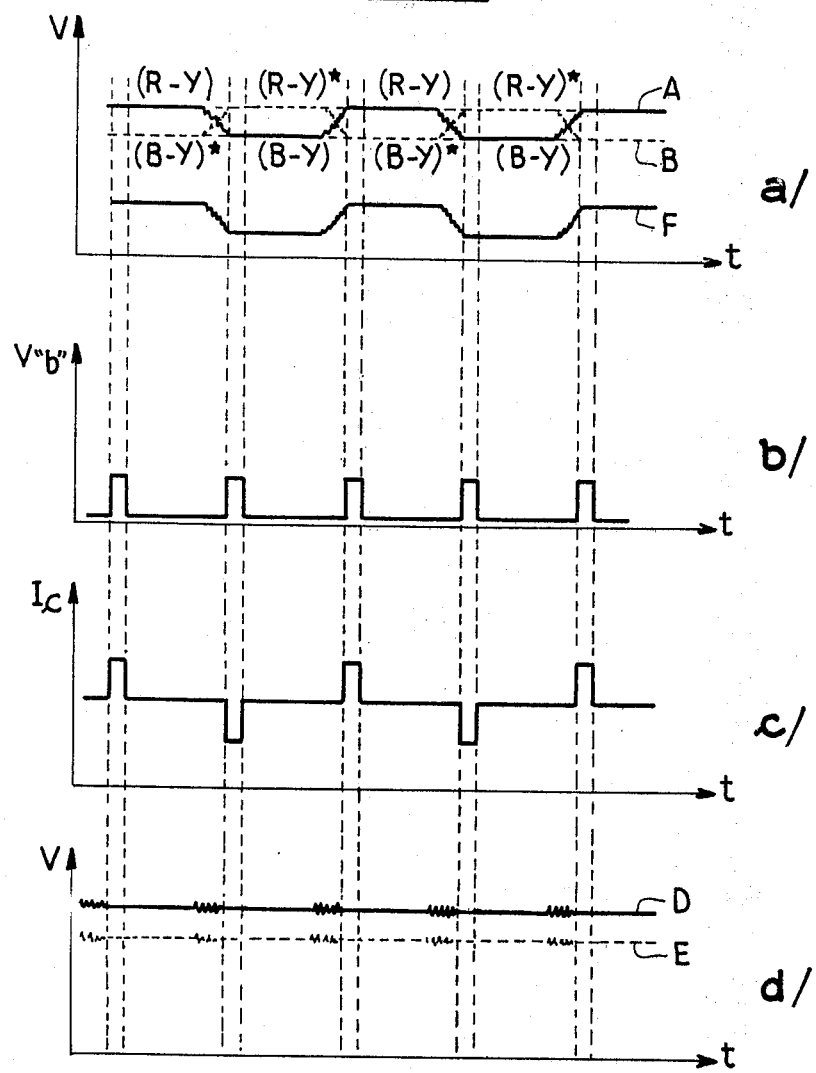

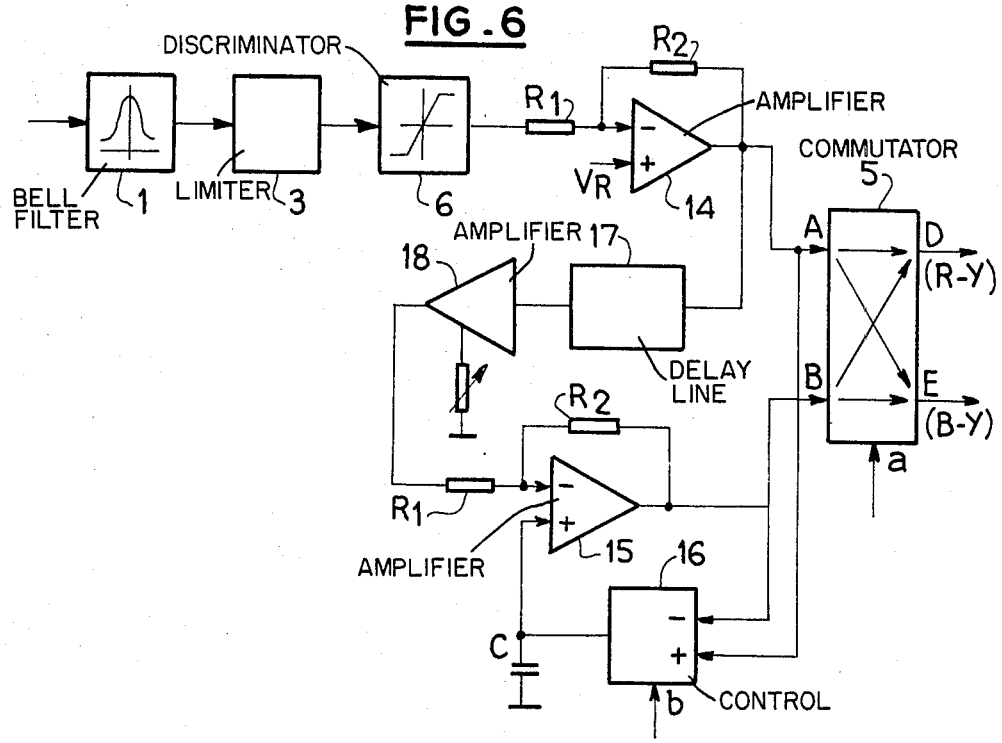
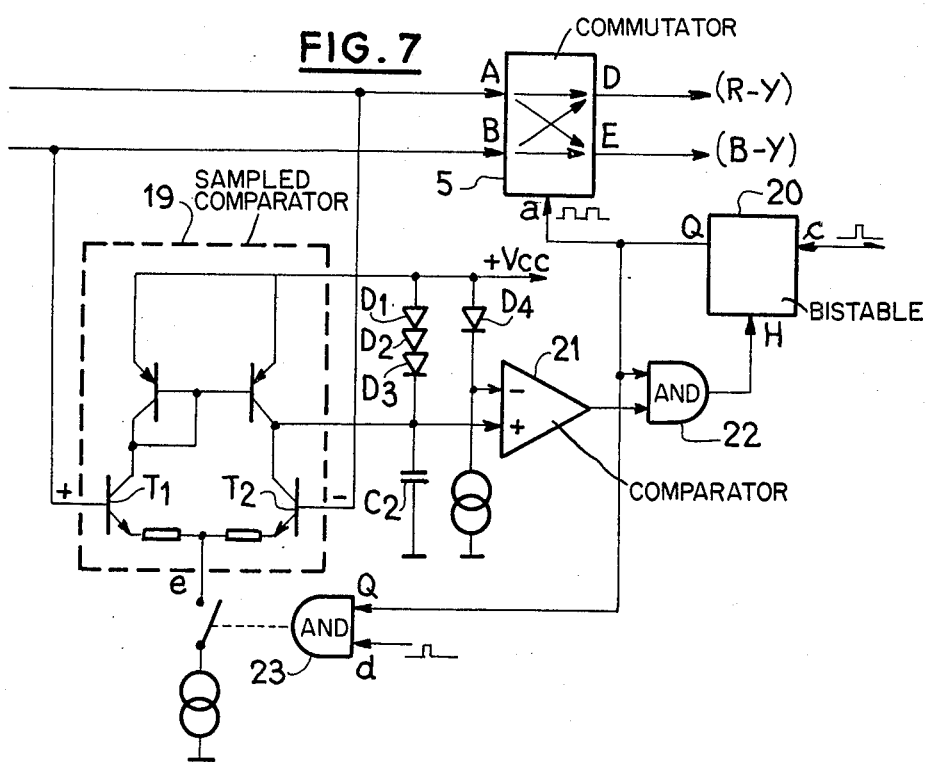

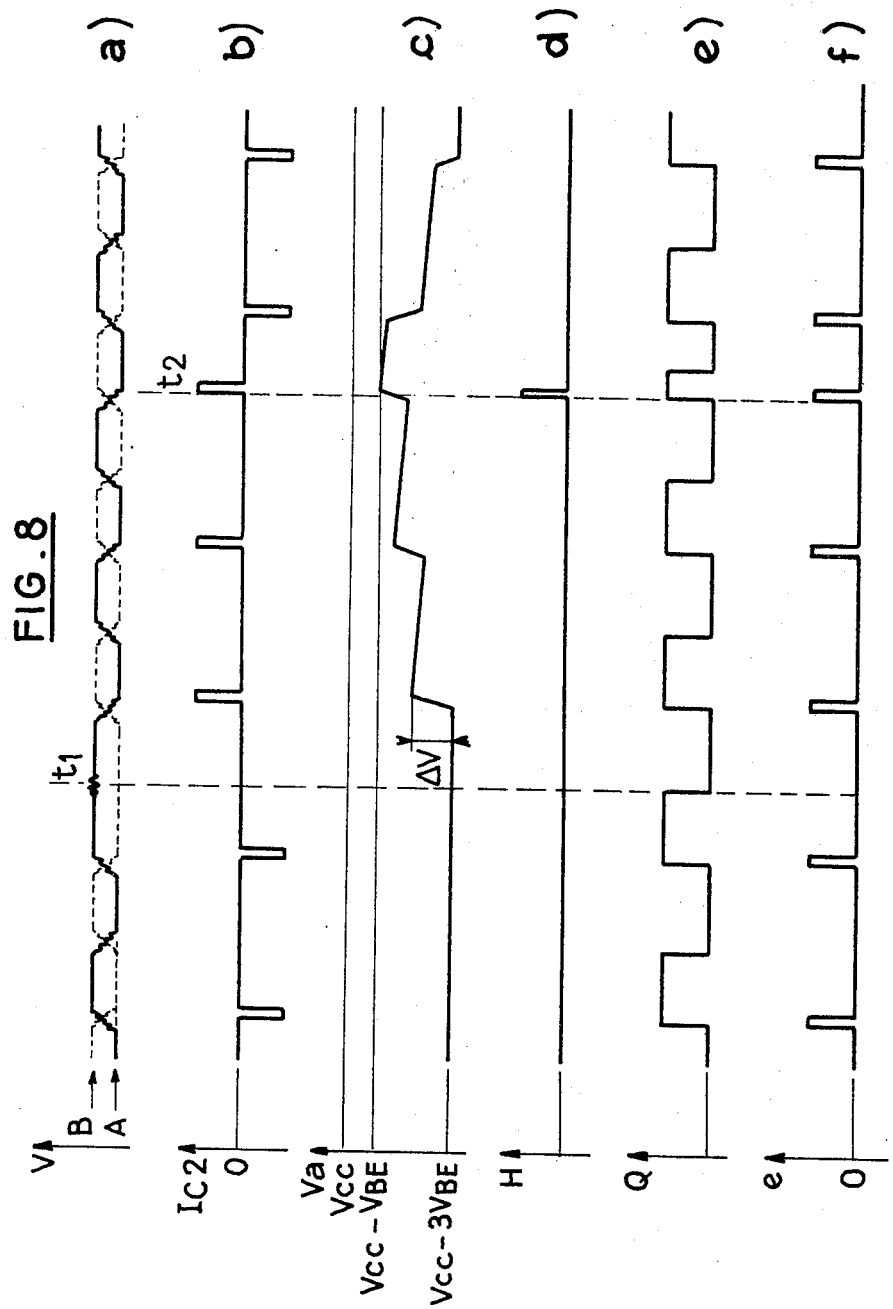

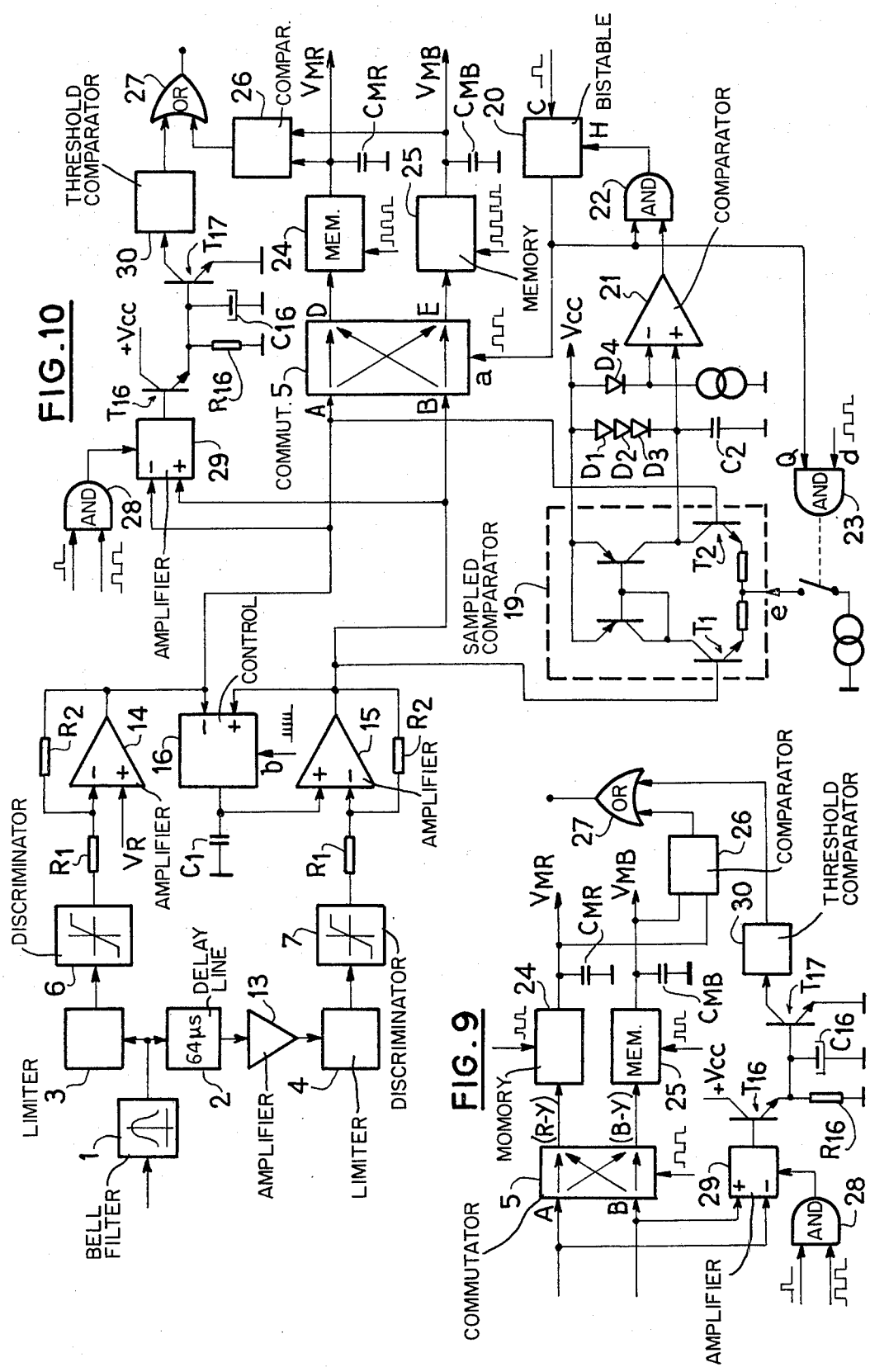

CIRCUIT FOR DECODING CHROMINANCE SIGNALS IN THE SECAM TELEVISION SYSTEM AND A TELEVISION RECEIVER COMPRISING THIS CIRCUIT

This invention relates to an electronic circuit for decoding red and blue chrominance information from the composite videofrequency signal in a colour television receiver based on the Secam system. The invention simplifies the decoding circuits and improves the characteristics of the decoded signal. It is particularly suitable for monolithic integration and eliminates the need for the adjustments normally required in the prior art.

In the Secam system, the colour information of a televised image is transmitted in the form of a frequency-modulated sub-carrier wave transmitted in superposition with the luminance signal Y which represents the black-and-white image. These two mixed signals give a signal which is known as the composite videofrequency signal.

In the television receiver, this videofrequency signal is obtained by the detection of the amplitude modulation of the intermediate-frequency signal of which the image carrier wave oscillates at 32.7 MHz. This intermediate-frequency signal is itself obtained after conversion of the high-frequency signal picked up by the antenna.

The Secam system is a sequential system, i.e. a signal (R-Y) representative of red is transmitted for the duration of one line (64 $\mu$s), after which a signal (B-Y) representative of blue is transmitted for the duration of the other line. The quiescent frequencies $F_{oR}$ and $F_{oB}$ of the sub-carriers are different for red and for blue: $F_{oR}=4.406$ MHz for red and $F_{oB}=4.250$ MHz for blue.

In order to identify the presence of a red line or blue line at the receiving end, a signal at the frequency $F_{oR}$ for a red line or a signal at the frequency $F_{oB}$ for a blue line is transmitted at the beginning of each line for 4.8 $\mu$s by the television transmitting station.

At the receiving end, it is best for the signal representing red and the signal representing blue to be simultaneously present. To this end, the information of one line is memorised for restoration at the following line, whence the use of a delay line which introduces a delay equivalent to one 64 $\mu$s line.

Since the first treatment which the composite videofrequency signal undergoes is to extract from it the colour identification frequencies and then to direct them to two demodulation channels, one of which is delayed by the duration of one line so that two signals $F_{oR}$ and $F_{oB}$ are available at the same time, the second operation consists precisely in identifying these signals, i.e. in measuring their frequencies so that they may be suitably directed to the "red" channel and to the "blue" channel, respectively.

However, these various operations are controlled and "authorised" by a so-called "keeper" circuit which performs a control function if the composite video signal contains a sub-carrier signal corresponding to the Secam system. In the absence of this sub-carrier, i.e. if the transmission is in black-and-white or if it emanates from a station transmitting by a system other than the Secam system, the keeper circuit inhibits certain stages of the decoding circuit and the image received on the television receiver is formed solely by its luminance components Y, i.e. in black-and-white.

In short, therefore, the decoding of the chrominance signals R-Y and B-Y from the composite video signal in the Secam system comprises three operations:

demodulation of the colour sub-carrier which is delayed by 64 $\mu$s on one channel so that a signal R-Y- and a signal B-Y- are simultaneously available;

identification of the quiescent frequencies transmitted at the beginning of a line, these frequencies being representative of the colours, and, at the same time, authorisation to treat these signals if the transmission corresponds to the Secam system.

Decoding circuits of the type in question exist and are known in various forms, their main disadvantage being a lack of stability. The use for example of tuned circuits necessitates a delicate manual adjustment of the external components which will not prevent instability of the demodulated output voltages in the event of changes in temperature. In addition, on account of their already outdated design, these known circuits are not designed to lend themselves readily to monolithic integration on a semiconductor crystal, nor can they be modified to include new components such as, for example, video delay lines of the CCD (charge coupled device) type which respresent significant advances.

On the other hand, as mentioned above, the present invention by its design eliminates the need for the adjustments normally required in the prior art for aligning the discriminators with the quiescent frequencies of the red and blue signals and also the need to adjust the identification of the colours. In addition, the system enables either an ultrasonic delay line operating at the level of the colour sub-carrier or a video delay line operating at the level of the demodulated signals (R-Y) and (B-Y) to be used for effecting the 64 $\mu$s delay required for the Secam decoders. Finally, the circuit according to the invention, which is simpler than the known circuits, improves the characteristics of the decoded signal and lends itself better to monolithic integration because it comprises few non-integratable components such as capacitors or adjustable self-induction coils.

Accordingly, the circuit according to the present invention is a circuit for decoding the chrominance signals (R-Y) and (B-Y) carried by the composite videofrequency signal in the Secam television system, comprising, from the "bell" input filter and on each of the two direct and retarded chrominance channels, a limiter and a discriminator connected to the input terminals of a commutator, characterised in that it uses in the first place a regulated differential amplifier stage delivering to the terminals of the commutator, at the beginning of each line, stable identification voltages corresponding to the identification frequencies of the colours red and blue; in the second place a colour identification stage connected to the terminals of the commutator which uses the difference in voltage between the identification voltage for red and the identification voltage for blue to control the commutator; in the third place, a "keeper" stage comprising on the one hand means for recognising the Secam process and, on the other hand, noise detection means, these two means co-operating with one another to authorise the decoding of the colours in the case where the television transmission corresponds to the Secam system and to inhibit decoding in other cases and also in cases where the transmission is parasitized.

The invention will be more easily understood by referring to the accompanying drawings which illustrate the various parts of the circuit and in which:

FIG. 5 is a synoptic comparison of the control signals and the video signals in this same demodulator.

FIG. 6 shows another embodiment of the decoder according to the invention.

FIG. 7 is a block diagram of the colour identification circuit.

FIG. 8 is a signal diagram illustrating the operation of the identification circuit.

FIG. 9 is a block diagram of the keeper circuit.

FIG. 10 is a general diagram of the decoding circuit according to the invention.

FIG. 1 shows in the form of a block diagram a conventional decoding circuit corresponding to the Secam system from the composite video signal to the demodulated chrominance signal R-Y or B-Y.

Figure 1:
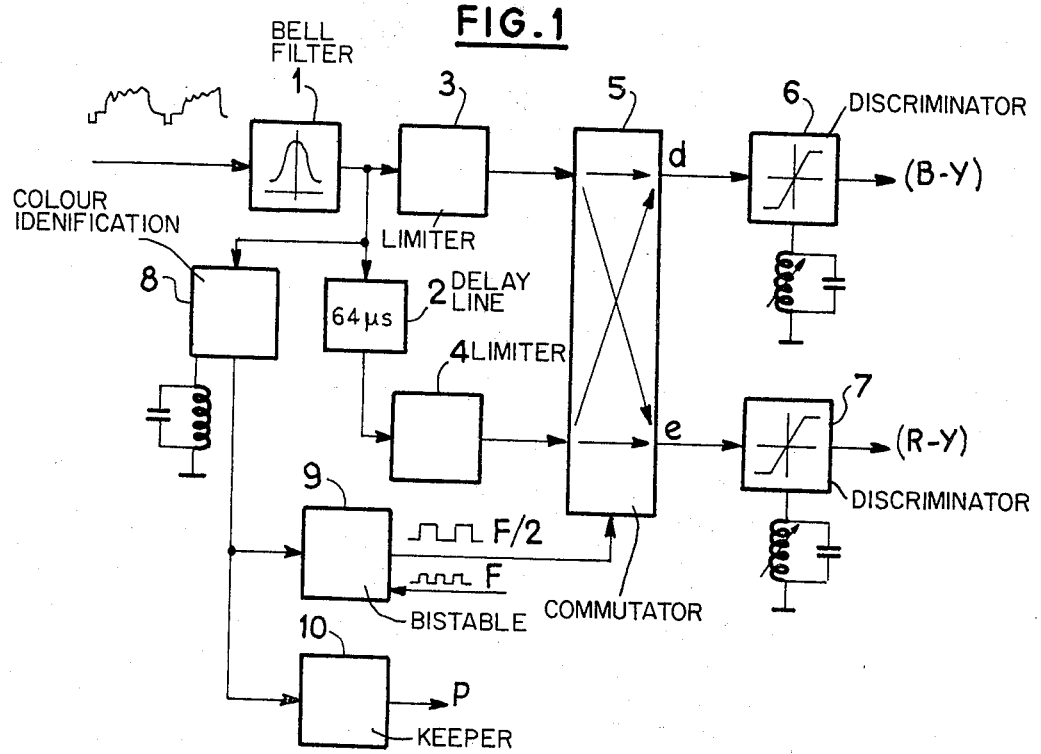
FIG. 1 is a block diagram of one Secam decoder corresponding to the prior art.

The colour sub-carrier signal is extracted and separated from the composite video signal by means of the bell filter 1 which, in addition to separating the sub-carrier signal, applies a phase and amplitude correction opposite to that made at the transmitting end with a view to improving the signal-to-noise ratio after demodulation.

On leaving the filter 1, the sub-carrier signal is directed either to the delay line 2 followed by a limiter 4 for the delayed channel or to the limiter 3 for the direct channel.

The direct channel and the delayed channel lead to a commutator 5 of which the function is to separate the sub-carrier information corresponding to blue at one of its outputs "d" and the information corresponding to red at its other output "e". This commutator is controlled by a pulse-like signal at half the line frequency F/2 coming from a bistable circuit 9 which itself is controlled by a synchronising signal at the line frequency F.

On leaving the commutator 5, the signal is demodulated by the discriminators 6 for blue for example and 7 for red. The continuous output level of each demodulator is regulated by a tuned circuit.

The circuit 8 is a colour identification circuit. It is tuned either to the information of $F_o$ red or $F_o$ blue at the beginning of a line or to the identification frequencies transmitted at the beginning of a frame throughout the duration of the red line for red and throughout the duration of the blue line for blue.

The function of this circuit is to bring the bistable circuit 5 into phase with the transmitted signal so that all the red information is directed to the output "e" of the commutator 5 whilst all the blue information is directed to the output "d".

The circuit 10 is a keeper circuit of which the function is to identify the presence in the video signal of information corresponding to the Secam system. If this detection is positive, the keeper circuit is released and the signal at its output P opens the other stages of the decoding circuit. In the opposite case, it inhibits these same stages so that reception is in black and white.

This type of circuit, which is well known, is attended by certain disadvantages:

since each of the signals R-Y or B-Y is demodulated by its own demodulator 6 or 7, it is not possible to use a video delay line based on charge coupled devices for example, because with this division of the functions the delay can only be applied at the level of the sub-carrier around 4.2 MHz and not in video after demodulation. It is therefore necessary to use ultrasonic delay lines of a piezoelectric ceramic for example.

The stability of the d.c. output voltages corresponding to the reference frequencies $F_{oR}$ and $F_{oB}$ is precarious because it can vary with the temperature or with the age of a tuned circuit in which the regulation components are sensitive to temperature or to adjustment.

The commutation which takes place at the level of the colour sub-carrier (around 4.2 MHz) is the seat of interference between the direct and delayed channels (cross-talk effect) which gives rise to parasitic effects on the demodulated signals R-Y and B-Y.

The need for a delicate adjustment for performing the colour identification function.

Figure 2:
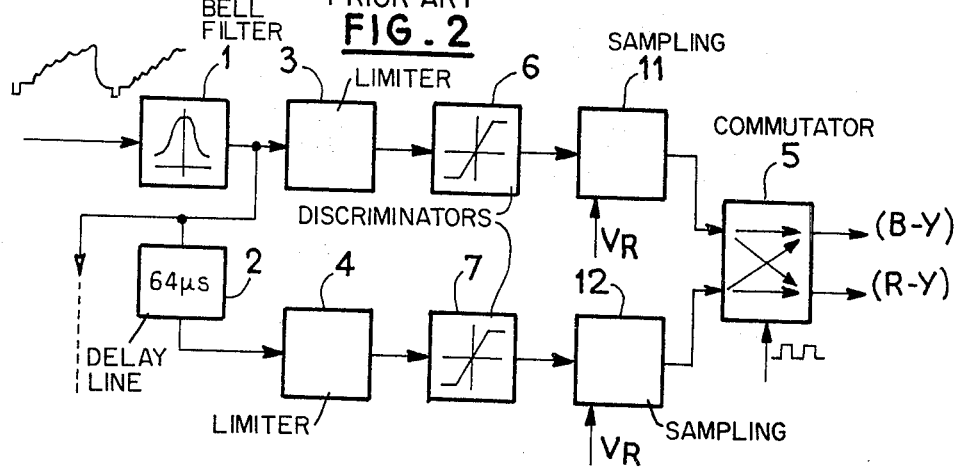
FIG. 2 is a block diagram of another Secam decoder corresponding to the prior art.

FIG. 2 is a functional diagram of another Secam decoder of which only the demodulating part has been shown in the interests of simplicity.

By comparison with FIG. 1, of which the function references have been retained each time one and the same circuit fulfills the same function, it appears that the commutator 5 follows rather than precedes the discriminators 6 and 7. Thus, each discriminator or demodulator operates sequentially on an alternating sequence of red and blue lines and, at its input terminals, the commutator receives signals demodulated to the low frequencies 0 to 1 MHz rather than alternating signals around 4 MHz which create interferences in the decoding system shown in FIG. 1. However, an improvement consists in introducing between the discriminators 6-7 and the commutator 5, on each channel, a circuit 11 or 12 for sampling the value of the voltage coming from the leading discriminator which corresponds to the transmission at the beginning of a line of the quiescent frequencies $F_o$. In these circuits 11 or 12, a comparator system automatically aligns the voltages of $F_{oR}$ and of $F_{oB}$ with a reference voltage $V_R$. In this way, the corresponding output level is fixed at $F_{oR}$ and $F_{oB}$.

In fact, this system is fairly complex and is difficult to produce, above all in integrated form on a semiconductor crystal.

Figure 3:
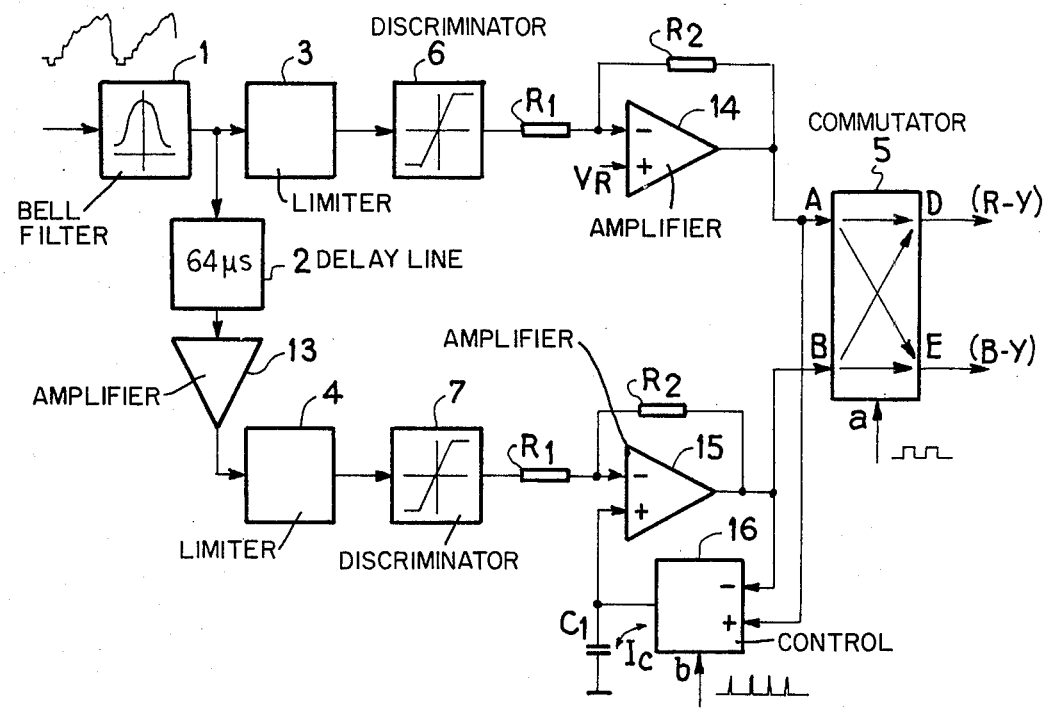
FIG. 3 is a block diagram of the signal-demodulating part of the circuit according to the invention.

The circuit according to the invention for decoding the chrominance signals obviates the various disadvantages mentioned in connection with these two circuits according to the prior art. The demodulating part of this circuit is shown in FIG. 3. In this demodulating circuit according to the invention, the quiescent voltage at the output of the discriminator on one of the two channels, which is arbitrarily the direct channel in FIG. 3 for example, but which could also be the delayed channel, is not regulated. This quiescent voltage depends on the circuit used and may vary to a significant extent from one circuit to the other, thus making it possible to use a discriminator having a very wide frequency band without any need for the quiescent frequency to be regulated.

By contrast, on the other channel which is the delayed channel in the case of the Figure chosen by way of example, a control circuit varies the d.c. output voltage to align it with the d.c. output voltage of the first channel.

The description of FIG. 3 will enable the operation of the demodulating circuit to be better understood. In order to facilitate comparison with the prior art circuits, the same references have been used in FIG. 3 to designate the same circuits fulfilling the same functions as in FIGS. 1 and 2.

In FIG. 3, the filter 1 extracts the colour sub-carrier, shapes it and then delivers it on the one hand to the direct channel, in which the signal is limited by the limiter 3, demodulated by the discriminator 6 and then amplified by an inverter amplifier 14 of which the quiescent output voltage depends upon its biassing $V_R$, and on the other hand to the delayed channel in which the signal is applied first to a delay line 2 and then to an amplifier 13, which compensates the losses of the delay line, and is subsequently limited by 4 and demodulated by 7.

The amplifier 15 is an inverter amplifier having the same gain as 14. Its output voltage depends upon the voltage applied to its positive input terminal. Now, this voltage is delivered by a sampled control circuit 16 which measures the difference in voltage between the points A and B, the input terminals of the commutator 5, at the beginning of a line during the transmission of the quiescent frequencies, and which converts this voltage difference into a proportional current $Ic_1$ which charges or discharges the capacitor $C_1$, depending on whether the current is positive (VA>VB) or negative (VA<VB).

Before continuing the description of the operation of the demodulating circuit according to the invention, it is important to point out that the two discriminators 6 and 7 are formed on the same semiconductor substrate. Thus, one effect of the monolithic integration is that the two discriminators have strictly identical or at least very similar characteristics.

Figure 4:
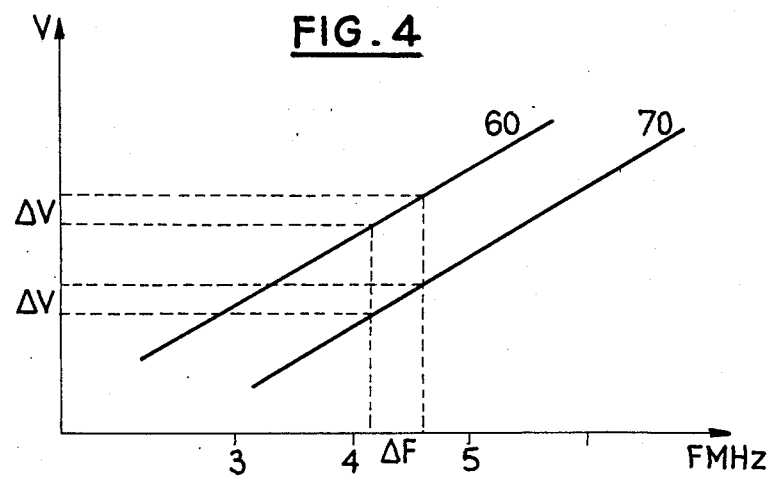
FIG. 4 is a curve representing the output characteristics of the two amplifiers of the demodulator shown in FIG. 3.

FIG. 4 shows the good matching of the slopes of each discriminator, i.e. their output voltages as a function of the input frequencies. If the straight line 60 is the voltage/frequency characteristic of the discriminator 6 for example, the straight line 70 is the voltage/frequency characteristic of the discriminator 7. Although these straight lines do not coincide with one another after production of the discriminators, they are parallel and it appears that the same frequency variation $\Delta F$ at the input end gives the same voltage variation $\Delta V$ at the output end.

On the one hand, this arrangement eliminates the need for regulation of the output level on one of the two discriminators, because both the discriminators automatically have the same peak-to-peak demodulated output voltage. On the other hand, it eliminates the need for regulation at the level of the quiescent frequencies of each discriminator because, as mentioned above, the discriminators selected are of a type having a very wide frequency range.

Thus, the choice and the construction of these discriminators afford numerous advantages in terms of simplification of the circuit and reliability in operation by eliminating the need for regulation and facilitate production by monolithic integration.

FIG. 5 will also enable the operation of the demodulator according to the invention shown in FIG. 3 to be better understood. It shows the various signals at the input terminals (FIG. 5a) and output terminals (FIG. 5d) of the commutator 5 and, at b, the shape of the sampling signal applied to the terminal b of the control circuit 16 and, at c, the shape of the control current $Ic_1$ coming from 16 and applied to the positive input of the inverter amplifier 15.

In order to be more explicit, this Figure shows the case where a white image is transmitted. The frequency of the colour sub-carrier is equal to $F_{oR}=4.406$ MHz throughout the duration of the red lines and to $F_{oB}=4.250$ MHz throughout the duration of the blue lines. The signal shown as a solid line in FIG. 5a represents by way of example the signal coming from the direct channel on the terminal A of the commutator, while the signal shown as an interrupted line represents the signal coming from the delayed channel at the terminal B. The commutator 5 is controlled at its terminal "a" by a pulse-like signal at half the line frequency which is delivered by a bistable circuit associated with a colour identification circuit.

The sampling pulses at the terminal "b" of the circuit 16 are present at the beginning of each line during the transmission of $F_{oR}$ and $F_{ob}$. Accordingly, they are at the line frequency, as illustrated in FIG. 5b.

When the voltages at A and B balance, as shown in FIG. 5, the current $Ic_1$ reverses at each line and keeps the same amplitude. In this way, the voltage at the terminals of the capacitor $C_1$ remains constant because, at each line, the capacitor is charged with the same current $Ic_1$ as that which discharged it at the preceding line (FIG. 5c).

At the output D of the commutator, the voltage corresponding to a first quiescent frequency, for example the red $F_{oR}$, on the direct channel is identical with that coming from the delayed channel. The same applies to the voltage corresponding to the other quiescent frequency which, in the example selected, is thus the blue $F_{oB}$(output E).

In this case where the voltages at the terminals of the inputs A and B of the commutator 5 balance, FIG. 5d shows the voltages at the output terminals D and E of this same commutator. Each of them is completely identical from one line to the other.

In the opposite case, i.e. where the voltages present at the terminals A and B at the beginning of each line during the transmission of $F_{oR}$ and $F_{oB}$ do not balance, the mean value of these voltages is no longer identical, as in FIG. 5a, and one of the two voltage diagrams has a mean value such as that shown for example at F which does not overlap the other diagram.

The effect of the various signals measured at the terminals A and B, which are also the input terminals of the sampled control circuit 16, is that the output current $Ic_1$ of this circuit 16 is no longer a current of which the value reverses at each line, as shown in FIG. 5c. On the contrary, the current $Ic_1$ retains a value and a direction which do not cancel one another out as long as the voltages at the terminals A and B do not balance. This current $Ic_1$ charges or discharges the capacitor $C_1$ according to the direction of the unbalance between the terminals A and B, thus modifying the voltage at the positive input terminal of the inverter amplifier 15 of which the output voltage depends upon the voltage applied to its positive input terminal. Since the inverter amplifiers 14 and 15 have the same gain, if VA>VB, the current $Ic_1$ is positive, the capacitor $C_1$ is charged and the amplifier 15 supplies an increased output voltage so that VA=VB; if VA<VB, the current $Ic_1$ is negative, the capacitor $C_1$ is discharged and the amplifier 15 supplies a reduced output voltage so that VA=VB.

Thus, measurement of the voltages at the input terminals A and B of the commutator by the control circuit 16 enables these voltages to be regulated through the amplifiers 14 and 15 and ensures that stable voltages are always available at the output terminals D and E of the commutator.

The demodulator according to the invention has the advantage over already known demodulators of being able to use either an ultrasonic delay line operating at the level of the colour sub-carrier with the limiters 3 and 4, as shown in FIG. 3, or a so-called "video" delay line, i.e. a delay line using an integrated technology of the charge coupled device (CCD) type for example. In addition to facilitating monolithic integration on a semiconductor crystal, this solution simplifies the circuit diagram because the delay line may be connected after the inverter amplifier of one of the channels, for example 14, the limiter 4 and the discriminator 7 of the other channel being omitted.

FIG. 6 shows the circuit diagram of a demodulator such as this which corresponds to the invention, comprising a "video" delay line 17 incorporated after the inverter amplifier 14. An amplifier 18 following the delay line 17 is intended to regulate the output level of the delay channel to make it identical with that of the direct channel in the absence of the control action of the circuit 16.

The demodulating circuit described above represents one of the three functions of the circuit according to the invention for decoding chrominance signals. The colour identification circuit represents a second function of this decoding circuit.

The function of this circuit is to bring the bistable circuit controlling the commutator back into phase when the commutator is not synchronised with the station transmitting the composite video wave.

The line-by-line identification uses the difference in voltage between the identification frequency of the red $F_{oR}$ and that of the blue $F_{oB}$ at the output of each discriminator or, more precisely if the circuit comprises a video delay line and a single discriminator, at the input terminals A and B of the commutator 5 shown in FIG. 3. The bistable circuit controlling the commutator is only brought back into phase after detection of the error on several lines, thereby ensuring immunity to noise.

The rapidity of identification may be programmed from outside the circuit by the choice of a capacitance value. This is an advantage which enables the identification time constant to be switched, for example for using a disc or magnetic tape video recording system. In recording systems such as these, the input signal is directly a low-noise demodulated video signal and, in this case, the identification circuit may operate line-by-line. There is no need for several lines to be controlled.

FIG. 7 shows the diagram of the identification circuit which is connected to the input terminals A and B of the commutator 5 shown in FIG. 3. By convention, it will be assumed that, in the same way as before, A corresponds to the direct channel and B to the delayed channel.

The sampled comparator circuit 19 measures the difference in voltage simultaneously present at A and B during the sampling period at every second line. It delivers a current $I_{c2}$ proportional to this voltage difference.

The current $I_{c2}$ is negative, i.e. it discharges the capacitor $C_2$ through one of the transistors of the comparator 19, namely the transistor T2, as long as the bistable circuit 20 is in phase with the signal of the transmitter. $I_{c2}$ discharges until the voltage at the terminals of the capacitor $C_2$ reaches a value equal to $V_{CC} - 3 V_{BE}$, $V_{CC}$ being the common feed voltage of the circuit 19 and the comparator 21 and $V_{BE}$ being the voltage drop of each of the three diodes D1, D2 and D3 connected in series between the feed voltage $V_{CC}$ and the capacitor $C_2$. The voltage $V_{CC} - 3V_{BE}$ corresponds to the threshold voltage for maintaining the regulation of the comparator 21. When this voltage is reached after discharge of the capacitor $C_2$, it is the diodes D1, D2, D3 which supply the necessary current and the voltage at the positive input terminal of the comparator 21 is constant and equal to $V_{CC} - 3V_{BE}$.

Since the voltage at the negative input terminal at the comparator 21 is by design equal to $V_{CC} - V_{BE}$, the fact that it is fed through a single diode D4 means that it is in fact greater than the voltage $V_{CC} - 3V_{BE}$ which is applied to the positive input. The output current of the comparator 21 is in the lower state and imposes a comparable position on the AND gate 22. Thus, as long as the bistable circuit 20 is in phase with the signal of the transmitter, this bistable circuit, which receives a pulse at the line return frequency at its terminal "c", delivers a pulse at half the line frequency to the terminal "a" of the commutator.

The operation of this colour identification circuit in the event of phase inversion between the transmitter and the bistable circuit 20 will be more readily understood by additionally referring to FIG. 8.

However, it is necessary to complete the description of the colour identification circuit which further comprises an AND gate 23. It receives the output signal Q of the bistable circuit 20 at one input and a sampling pulse at each line at another input denoted by the reference "d", and delivers a sampling pulse every second line at its output "e". This pulse controls the sampled comparator 19.

FIG. 8 compares the signals at various points of the colour identification circuit in the event of a phase shift either at the transmitter or by accident in the television receiver.

FIG. 8a shows the voltages at the terminals A and B of the commutator where the transmitted image is a white image. A phase inversion occurs at the instant t1 at the television transmitter.

From this instant t1, the current $I_{c2}$ charges the capacitor $C_2$ (FIG. 8b), the voltage Va at the terminals of the capacitor $C_2$ increases at each line by the error voltage $\Delta V$ produced by the sample comparator 19 until it reaches the threshold voltage of the negative input of the comparator 21, i.e. $V_{CC} - V_{BE}$ (FIG. 8c). From this instant t2, the output of the comparator 21 is in the upper state, the gate 22 delivers a phase-restoring pulse H to the bistable circuit 20 (FIG. 8d) which in turn transmits at its output Q a phase-restoring pulse (FIG. 8e) simultaneously to the commutator 5 and to the AND gate 23 which brings the sampled comparator 19 back into phase at its control input "e" (FIG. 8f).

The time taken to bring the bistable circuit 20 back into phase, i.e. to bring the entire colour identification circuit back into phase, depends upon the voltage difference $\Delta V$ which itself depends upon the sampling time,
upon the charging current $C_2$, on the value of the capacitor $C_2$.

Since the capacitor $C_2$ is external, it enables the identification time to be programmed.

In cases where a significant noise level is transmitted with the composite video signal, the mean value of the current $I_{c2}$ is always negative and discharges the capacitor $C_2$ if $V_A < V_B$ and if the bistable circuit is in phase. By contrast, if $V_A > V_B$, $I_{c2}$ is always positive and charges the capacitor $C_2$.

This arrangement provides for very high immunity to noise because this identification circuit measures the sum of the voltage differences at the output of the two discriminators of which v1 is the voltage difference between $F_{oR}$ and $F_{oB}$ at the output of the discriminator of the direct channel and v2 the voltage difference on the delayed channel.

The useful difference from one line to the other is equal to v1+v2.

In cases where a signal is transmitted with a superimposed noise component equal to $vb_1$ for the direct channel and $vd_2$ for the delayed channel, the useful signal is equal to v1+v2 to which is added the quadratic sum of the two noises:

$$V \text{ total noise} = \sqrt{(vb_1^2 + vb_2^2)}$$

Since, on average, $$v1 = v2 \text{ and } vb_1 = vb_2,$$

a signal of amplitude 2V is obtained to which is added the noise equal to $vb\sqrt{2}$.

The signal-to-noise ratio is thus improved $R$ $S/n = (2v)/(\sqrt{2}vb)$ instead of being equal to $v/vb$.

By using two discriminators in parallel, the signal-to-noise ratio is improved by three decibels in comparison with the signal-to-noise ratio obtained with a single discriminator.

In addition to demodulation and colour identification, the treatment circuit according to the invention fulfills a third function, namely: monitoring the composite video signal to determine whether or not this signal carries any sub-carrier information corresponding to the Secam system. Commensurate with its function, this part of the treatment circuit is known as a "keeper circuit". In the presence of a Secam transmission, the keeper circuit brings into operation the sub-carrier rejection circuits on the luminance treatment channel and authorises the operation of the decoding stages on the chrominance treatment channel. If the transmission is in black and white or even in colour, but under a system such as the PAL or NTSC system, the keeper circuit inhibits the operation of the decoding stages on the chrominance channel and only authorises the passage of the luminance signals which give a black and white image on the screen of the receiver tube. The keeper circuit also has to come into operation when the demodulated output noise level is too high. It blocks the chrominance channel and the image obtained solely through the luminance channel is in black and white.

FIG. 9 shows the diagram of the keeper circuit according to the invention. This circuit is connected to the demodulating circuit shown in FIG. 3 at the input terminals A and B of the commutator 5. Two sampling and memory circuits are connected to the output terminals of the same commutator, the circuit 24 memorising the voltage $V_{MR}$ corresponding to the demodulation of the identification frequency $R_{oR}$ by means of the capacitor $C_{MR}$ and the circuit 25 memorising the voltage $V_{MB}$ corresponding to $F_{oB}$ by means of $C_{MB}$. Sampling takes place at the beginning of a line during the transmission of the frequencies $F_{oR}$ and $F_{oB}$.

The voltage difference $\Delta V_2$ and between $V_{MR}$ and $V_{MB}$ depends on the difference between the two frequencies $F_{oR}$ and $F_{oB}$ and is known. The comparator 26 monitors the presence of this voltage difference $\Delta V_2$ and measures it with an accuracy of, for example, ±100 mV. If, for a nominal difference $\Delta V$ equal to 200 mV, the difference measured by the comparator 26 is not situated between 100 and 300 mV, the television transmission does not correspond to the Secam system, the comparator 26 delivers at its output a signal in the upper state which controls the logic OR-gate 27 of which the output is also in the upper state. In the opposite case, i.e. if the voltage difference $\Delta V_2$ is situated between 100 and 300 mV, the transmission corresponds to the Secam system and the output of the comparator 26 is in the lower state, as is the output of the OR-gate 27.

The keeper circuit according to the invention additionally comprises a noise detector. In this noise detector, the differential amplifier 29 receives at its negative and positive inputs the demodulated signals picked up respectively at the input terminals A and B of the commutator 5 and, at its control terminal, the signal coming from the AND-gate 28. The AND-gate 28 is controlled on one channel by the sampling pulses at the beginning of each line and, on the other channel, by pulses at half the line frequency. In the event of synchronism between two pulses, the AND-gate controls the differential amplifier 29 every second line during the transmission of the identification frequencies $F_{oR}$ and $F_{oB}$.

Since, by convention in this text, the "red" signals are treated on the channel "A" and the "blue" signals on the channel "B" and since the frequency $F_{oR} = 4.406$ MHz is higher than the frequency $F_{oB} = 4.250$ MHz, the voltage present at the terminal A is always higher by $\Delta V_2$ than the voltage present at the terminal B. The output voltage of the differential amplifier 29 is always positive for $V_B > V_A$.

As long as there is no noise, or providing any noise present is low enough for $V_A$ to remain higher than $V_B$, the output voltage of the differential amplifier 29 is zero or negative.

In cases where a considerable noise level is superimposed upon the signals at A and B, $V_B$ may become higher than $V_A$, producing a positive voltage at the output of the amplifier 29. The threshold detecting circuit, consisting essentially of the transistors T16 and T17, detects this voltage at a value situated between the peak value and the mean value of the noise: this depends upon the values of the resistor R16 and the capacitor C16 which may be programmed. When the detected voltage exceeds the base-to-emitter voltage $V_{BE}$ of the transistor T17, this transistor becomes conductive and controls the threshold comparison circuit 30 of which the output in the upper state controls the OR-gate 27 which flips, its output also passing to the upper state.

In short, the keeper circuit consists on the one hand of a keeper circuit proper and, on the other hand, of a threshold detecting circuit which control the two inputs of an OR-gate: the output of this OR-gate is in the lower state if the transmission corresponds to the Secam system and takes place under favourable conditions without any parasitic influences, but is in the upper state if the transmission does not correspond to the Secam system or is heavily parasitized. In this latter case, the chrominance circuits are inhibited.

FIG. 10 is the diagram of the complete circuit according to the invention for treating chrominance signals which comprises a demodulation circuit, a colour indentification circuit and a keeper and noise detection circuit.

The colour treatment circuit according to the invention has the following advantages over existing circuits:

its design provides for monolithic integration on a semiconductor substrate;

by virtue of integration, the characteristics of the components on the two chrominance channels are very well matched, thus eliminating the need for the demodulators to be regulated for balancing their output levels;

reduction in crosstalk between the direct and delayed channels by virtue of the commutation after demodulation of the signals;

excellent precision of the alignment of the continuous levels between the direct channel and the delay channel by virtue of the line-by-line sampling;

elimination of the need to regulate the colour identification circuit and the fact that the rapidity of identification can be programmed by an external capacitor;

better immunity to noise of the identification stage;

dual function of the keeper circuit which also detects the noise and cuts the colour when the image is too degraded.

What I claim is:

1. A circuit for decoding the chrominance signals (R-Y) and (B-Y) carried by the composite videofrequency signal of a Secam television system, comprising:
   a "bell" input filter for extracting a color sub-carrier signal from said composite videofrequency signal;
   direct and delayed chrominance channels adapted to receive said color sub-carrier signal from said "bell" input filter, each of said direct and delayed chrominance channels having an output;
   a commutator having a first input coupled to said output of said direct chrominance channel, and a second input coupled to said output of said delayed chrominance channel, and having (R-Y) and (B-Y) outputs;
   said direct and delayed chrominance channels together including a regulated differential amplifier stage for providing, at the beginning of each line, stable identification voltages, corresponding to red and blue identification frequency signals, to said first and second inputs of said commutator;
   a color identification circuit, coupled to said input terminals of said commutator for controlling said commutator responsive to the difference in signal level between said first and second inputs; and
   a "keeper" circuit including means for recognizinig a Secam-type transmission and noise detecting means, said means for recognizing and noise detecting means together providing for the decoding of the colors to be displayed and the inhibiting of color display for non-Secam-type transmissions or parasitized transmissions.

2. A circuit according to claim 1 wherein
   one of said direct or delayed chrominance channels includes a first differential amplifier having a positive input coupled to a reference voltage; and
   the other of said direct and delayed channels includes a second differential amplifier having characteristics substantially identical to those of said first differential amplifier, and having a positive input;
   said circuit further comprising:
   a sampled control circuit having input terminals coupled to said input terminals of said commutator for providing an output current that is a function of the signals at said inputs of said commutator circuit; and
   a capacitor coupled to said output current so as to be charged or discharged thereby, said capacitor being coupled to said positive input of said second differential amplifier, whereby said second amplifier operates to align the identification voltage level of its associated channel with the identification voltage associated with the first differential amplifier.

3. A circuit according to claim 1 wherein said color identification circuit comprises:
   a sampled comparator having inputs coupled to said inputs of said commutator for providing an output signal related to the signals at said commutator inputs;
   a second comparator having a first input adapted to receive said output signal of said sampled comparator and a second input coupled to a reference signal and an output;
   a first AND-gate having a first input coupled to said output of said second comparator;
   a bistable circuit having a phase restoration input coupled to the output of said first AND-gate, the output of said bistable circuit being coupled to a control input of said commutator and to a second input of said first AND-gate;
   a second AND-gate having an input coupled to the output of said bistable circuit and acting as a sampling pulse generator for said sampled comparator, whereby colors are identified by utilizing the voltage difference between said inputs of said commutator to synchronize said commutator with the television transmitter transmitting said Secam composite videofrequency signal by controlling the phase of said bistable circuit.

4. A circuit according to claim 1 wherein said "keeper" circuit comprises:
   a Secam identifying circuit including:
     a first capacitor adapted to receive a signal from said (R-Y) output of said commutator;
     a second capacitor adapted to receive a signal from said (B-Y) output of said commutator; and
     a comparator coupled to said first and second capacitors so as to receive and compare, at the beginning of a line, identification frequencies for red and blue represented by the voltage signals on said capacitors; and
   a noise detecting circuit including:
     a differential amplifier having inputs coupled to said inputs of said commutator;
     an AND-gate having an output coupled to a control input of said differential amplifier so as to cause said differential amplifier to sample and compare the signals at the input of said commutator at the beginning of each line;
     a threshold detecting circuit coupled to the output of said differential amplifier; and
     a threshold comparison circuit coupled to the output of said threshold detecting circuit;
   the outputs of said Secam identifying circuit and said noise detecting circuit being coupled to respective inputs of an OR-gate, whereby said OR-gate provides a first output level when the voltage difference between said capacitors indicates a Secam transmission and a second output level when the voltage difference between said capacitors indicates an absence of a Secam transmission or the presence of noise exceeding a predetermined threshold.

5. A circuit for decoding chrominance signals as claimed in claim 1 wherein said delayed chrominance channel comprises an ultrasonic delay line which operates at the level of the colour sub-carrier and a limiter circuit coupled either directly or indirectly to said ultrasonic delay line.

6. A circuit for decoding chrominance signals as claimed in claim 1 wherein delayed chrominance channel comprises a video delay line including a CCD (charge coupled device) which operates after demodulation of the sub-carrier wave by a discriminator in the direct chrominance channel.

7. A circuit for decoding chrominance signals as claimed in claim 1 wherein said colour identification circuit comprises a variable capacitor which enables the identification time to be modified on one or more lines.

8. A circuit for decoding chrominance signals as claimed in claim 1 wherein said circuit is integrated on a semiconductor crystal.

* * * * *